July 30, 1929.  F. A. SELJE  1,722,543
SEAT CONSTRUCTION
Filed Sept. 12, 1927
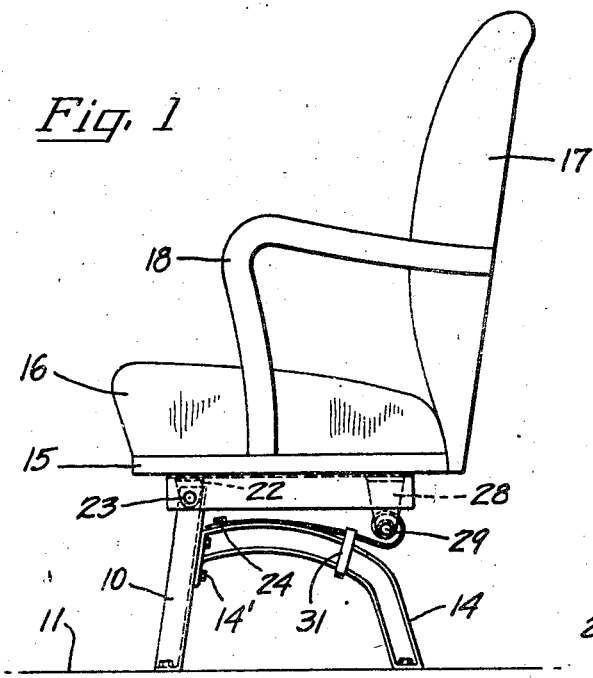
Fig. 1
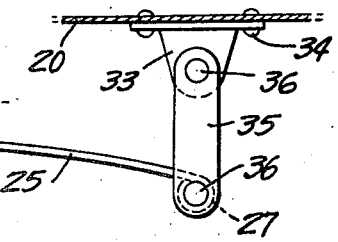
Fig. 5
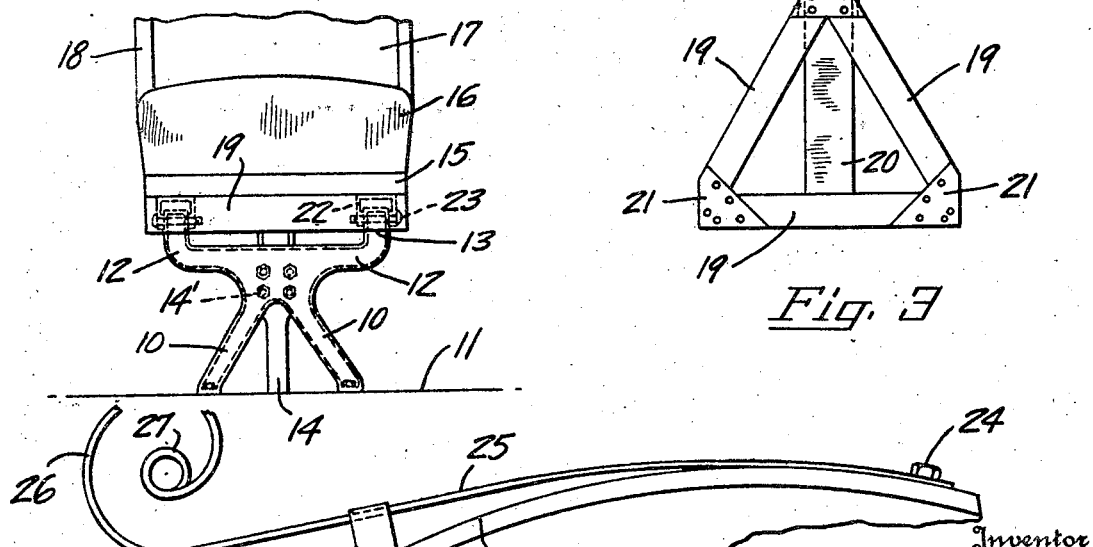
Fig. 2
Fig. 3
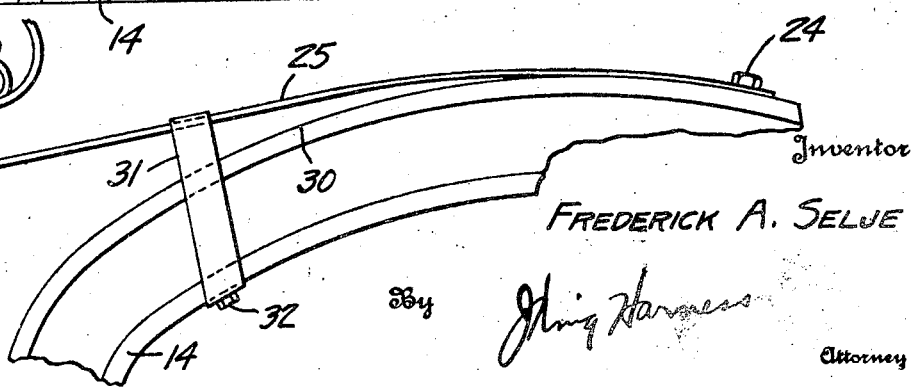
Fig. 4
Inventor
FREDERICK A. SELJE
By Irving Harness
Attorney Patented July 30, 1929.

1,722,543

UNITED STATES PATENT OFFICE.

FREDERICK A. SELJE, OF HIGHLAND PARK, MICHIGAN, ASSIGNOR TO THE MURRAY CORPORATION OF AMERICA, A CORPORATION OF DELAWARE.

SEAT CONSTRUCTION.

Application filed September 12, 1927. Serial No. 218,907.

This invention relates to seat constructions and particularly to that type so constructed that the seat back and seat bottom may move in unison upon flexture of their supporting means, the principal object being the provision of a new and novel type of such seats.

Another object is to provide a seat construction in which the seat bottom and seat back are secured together, the seat bottom being pivotally supported adjacent its forward edge and being supported adjacent its rearward edge by spring means.

Another object is to provide a seat construction in which the seat bottom and seat back are rigidly connected together and are resiliently supported for pivotal movement about a point adjacent the forward edge of the seat bottom.

Another object is to provide a seat construction in which the seat bottom and seat back are rigidly secured together and are pivotally supported about a horizontal line adjacent the forward edge of the seat, the seat being resiliently supported adjacent its rear edge by means of a leaf spring yieldable to allow the entire seat structure to pivot about its pivotal point.

A further object is to provide a seat comprising a bottom and back rigidly secured together and pivotally supported adjacent the forward edge of the bottom, the rear portion of the seat being supported by means of a leaf spring co-acting with a cam like surface whereby the effective free length of a spring is shortened in accordance with the weight carried thereby, thus increasing the spring resistance in accordance with the weight imposed thereon.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views,—

Fig. 1 is a side elevation of a seat such as is particularly suitable for use in connection with passenger busses and the like.

Fig. 2 is a front elevation of the seat shown in Fig. 1.

Fig. 3 is a plan view of the seat bottom supporting frame.

Fig. 4 is an enlarged fragmentary side elevation of the supporting spring and co-acting supporting surface.

Fig. 5 is a fragmentary side elevation of a modified form of securing means between the free end of the supporting spring and the seat bottom.

The supporting standard for the seat, as shown in the drawing, comprises a member having a pair of converging legs 10, the lower ends of which form feet which are adapted to be secured to the floor 11, a pair of outwardly extending portions 12 which terminate in the upwardly extending eye portions 13, and a third leg 14 which is secured adjacent the point of convergence of the legs 10 by the bolts 14' and extends centrally rearwardly therefrom, terminating in a downwardly extending portion in contact with the floor 11, thus serving as a third leg or foot. The seat proper comprising a seat bottom 15 provided with a resilient cushion 16 and a seat back 17 preferably rigidly secured to the bottom 15. Side arms such as 18 may be provided when desired. The bottom 15 is secured to a triangular frame comprising inverted channel-shaped side-members 19 and a central member 20 extending from the center of the forward side-member 19 to the junction of the two side side-members 19. Suitable gussets such as 21 are provided at the corners of the frame, and secured to the underside of the forward side frame-member 19 are a pair of downwardly extending yoke members 22 spaced to receive the upwardly extending eye portions 13 of the forward supporting member. Pins such as 23 extend through both the eye portions 13 and the yoke members 22, thereby pivotally securing the same together. Secured by bolts such as 24 to the upper surface of the forward end of the third leg 14 is a flat spring strip 25 which extends rearwardly therefrom and is provided at its rear end with a spiral coil 26 terminating in a central eye 27. A bracket 28 secured to the lower face of the member 20 adjacent the junction of the two side side-members 19 is pivotally connected to the eye 27 by a bolt 29. It will be noticed that the spring 25, when the seat is in free or unloaded position, contacts with the top surface of the leg 14 for a relatively short distance only, it being spaced therefrom for the greater part of its length. The seat bottom and back are thus pivotally supported about the pins 23 at the forward edge of the seat bottom and are resiliently supported adjacent the rear edge of the seat bottom by the spring 25, thus providing a seat which when a weight is imposed thereon pivots about the pins 23. In practice I prefer to form the upper face 30 of the leg 14 to simulate a cam so that when a weight is imposed upon the seat and the spring 25 is deflected thereby the length of the spring 25 which comes in contact with the surface 30 increases in accordance with the load imposed on the seat thereby shortening the effective length of the spring 25 which is called upon to resiliently support the load imposed on the seat. The rate of deflection of the spring is thereby decreased in accordance with the load and automatically adjusts itself to accommodate any reasonable weight imposed thereon. Preferably the spring 25 is so formed as to be put under a slight initial tension without load when the seat bottom is in horizontal position as indicated in Fig. 1, and for this purpose a strap such as 31 is provided over the spring 25 and held against movement on the leg 14 by a bolt such as 32 or other suitable means so that when the seat is unoccupied it will remain in substantially horizontal position.

In Fig. 5 a modified form of securing means for the free end of the spring 25 to the seat supporting frame is illustrated. The free end of the spring 25 is formed without the addition of the spiral coil portion 26. A short bracket 33 is secured to the frame member 20 by rivets such as 34 in approximately the same relative position as the bracket 28. Shackles 35 and cooperating pins 36 connect the eye 27 with the bracket 33. This form of construction may be found more suitable for certain types of construction indicated.

The construction thus provided affords a very comfortable and easy riding seat particularly adaptable for use in connection with motor busses and other passenger carrying vehicles inasmuch as it does not tend to pinch the occupants when the vehicle jounces up and down, and also prevents undue vertical movement due to the means for increasing the resistance of the spring suspension means. Further, the legs of the occupant are not rubbed against the forward edge of the seat upon movement of the seat in absorbing jars or shocks such as is a common occurrence in those seats in which the entire seat bottom moves vertically instead of pivoting as in the present construction.

Although I have shown in the drawing a seat of single width, it will be apparent that the principals of the construction are applicable to wider seats. It will further be apparent that in those cases in which the seat is of sufficient width, it may be necessary to provide two or more legs such as 14 and springs such as 25, the frame such as is shown in Fig. 3 being necessarily modified to allow for such modification of the construction. Although I have shown the spring 25 as being of a single leaf type, it will be obvious that in some cases it may be found desirable to employ what is commonly known as a multiple leaf spring, and these and other formal changes may be made in the specific embodiment of the invention described without departing from the spirit or substance of the broad invention, the scope of which is commensurate with the appended claims.

What I claim is:

1. In combination, a seat, a forward supporting leg and a rearwardly extending supporting leg, said seat being pivotally secured to said forward supporting leg adjacent the front edge of the seat, and a leaf spring rigidly secured to one of said legs adjacent the point of pivot of said seat and extending rearwardly therefrom, the free end of said spring being secured to said seat, said spring co-operatively engaging said rearwardly extending leg an amount increasing with increased load on said seat.

2. In combination, a seat comprising a back and bottom rigidly secured together, a support for said seat comprising a pair of forward supporting legs and a rearwardly extending leg, said seat being pivotally mounted adjacent its forward edge to said forward supporting legs, a leaf spring secured at one end to said support and extending rearwardly therefrom over said rearwardly extending leg, the free end of said spring being secured to said seat adjacent the rear edge thereof, said rearwardly extending leg formed with an upper camlike surface which said spring is adapted to contact with an amount commensurate with the deflection thereof caused by variations of weight or weight moments on said seat.

3. In a seat structure, in combination, a supporting standard comprising a pair of integrally connected front leg portions and a third leg rigidly secured thereto and extending rearwardly therefrom, said third leg including an upwardly exposed cam surface, a seat bottom secured adjacent its forward edge to said front leg portions to pivot about a fixed line, a spring rigidly secured at one end adjacent the forward end of said third leg and extending rearwardly over said cam surface in cooperating relationship therewith, and means connecting the rear end of said spring to said seat bottom at a point adjacent the rear edge thereof.

4. In a seat structure, in combination, a supporting standard comprising a pair of front leg members and a third leg member rigidly secured thereto and extending rearwardly midway there-between, said third leg being provided with an upwardly exposed cam surface, a triangular frame having two of its vertices pivotally connected to said front leg members and extending rearwardly therefrom, a leaf spring rigidly secured to said third leg adjacent the forward end thereof extending rearwardly in cooperating relationship with respect to said cam surface, means connecting the rear end of said spring to the third vertex of said frame, and a seat bottom and seat back carried by said frame.

5. In a seat structure, a supporting standard comprising a plurality of leg members one of which is provided with an upwardly facing rearwardly extending cam face, a leaf spring secured adjacent one end adjacent the forward end of said cam face and extending rearwardly in co-operative relationship with respect to said cam face, said cam face being substantially co-extensive with said spring, a seat bottom secured adjacent its forward edge to pivot on said standard about a fixed line and connected to said spring adjacent its rear edge, and means connecting said spring and said leg member provided with said cam face for limiting the rebound of said spring.

FREDERICK A. SELJE.